United States Patent
Lee et al.

(10) Patent No.: US 9,749,831 B2
(45) Date of Patent: Aug. 29, 2017

(54) METHOD AND APPARATUS FOR GENERATING DISTRESS SIGNAL

(71) Applicant: Samsung Electronics Co., Ltd., Suwon-si (KR)

(72) Inventors: Jung-Yub Lee, Yongin-si (KR); Do-Hyuk Ha, Yongin-si (KR); Young-Ju Lee, Seoul (KR)

(73) Assignee: Samsung Electronics Co. Ltd. (KR)

( * ) Notice: Subject to any disclaimer, the term of this patent is extended or adjusted under 35 U.S.C. 154(b) by 0 days.

(21) Appl. No.: 14/980,646

(22) Filed: Dec. 28, 2015

(65) Prior Publication Data
US 2016/0192168 A1 Jun. 30, 2016

(30) Foreign Application Priority Data
Dec. 29, 2014 (KR) .......................... 10-2014-0191955

(51) Int. Cl.
*H04M 11/04* (2006.01)
*H04W 4/22* (2009.01)
(Continued)

(52) U.S. Cl.
CPC ............ *H04W 4/22* (2013.01); *H04B 5/0031* (2013.01); *H04B 5/0037* (2013.01);
(Continued)

(58) Field of Classification Search
CPC ........ G08B 1/08; G08B 23/00; G08B 25/016; H04W 88/02; H04W 4/00; H04W 4/22;
(Continued)

(56) References Cited

U.S. PATENT DOCUMENTS 5,982,322 A * 11/1999 Bickley ................. G01S 5/0027
342/357.59
6,314,281 B1 * 11/2001 Chao ......................... G01S 1/68
455/404.2
(Continued)

FOREIGN PATENT DOCUMENTS

CN 203423689 U 2/2014
CN 102291498 B 6/2014
(Continued)

OTHER PUBLICATIONS

European Search Report for EP 15202373 dated Mar. 8, 2016.

*Primary Examiner* — Mahendra Patel
(74) *Attorney, Agent, or Firm* — McAndrews, Held & Malloy, Ltd.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. Disclosed are an apparatus and method for generating distress signals in a mobile device. The apparatus comprises a coil antenna for NFC communication, a first communication circuit configured to perform the NFC communication using the coil antenna in a normal mode, a second communication circuit transmitting a distress signal having a rescue-dedicated frequency through the coil antenna in a distress mode, a switch connecting the coil antenna to the first communication circuit or the second communication circuit, and a processor determining the normal mode or the distress mode to control the switch.

10 Claims, 10 Drawing Sheets

(51) Int. Cl.
*H04W 4/00* (2009.01)
*H04B 5/00* (2006.01)
*H04W 88/02* (2009.01)

(52) U.S. Cl.
CPC .......... *H04B 5/0093* (2013.01); *H04W 4/005* (2013.01); *H04W 4/008* (2013.01); *H04W 88/02* (2013.01)

(58) Field of Classification Search
CPC ... H04W 76/007; H04W 4/005; H04W 4/008; H04W 88/06; H04B 1/3805; H04B 5/0031; H04B 5/0037; H04B 5/0093; H04B 1/034; H04M 1/02; H04M 11/04; H01Q 1/08; H01Q 1/273; H01Q 1/362; H01Q 25/00; H01Q 9/0407; H01Q 21/28; H01Q 1/42
USPC ................. 455/404.1, 404.2, 11.1, 445, 450; 340/573.1, 988; 701/517
See application file for complete search history.

(56) References Cited

U.S. PATENT DOCUMENTS

| | | | |
|---|---|---|---|
| 6,456,228 B1 | 9/2002 | Granhed et al. | |
| 7,346,336 B2 * | 3/2008 | Kampel | A63B 29/021 340/539.11 |
| 7,586,463 B1 * | 9/2009 | Katz | H01Q 1/08 343/718 |
| 7,623,842 B2 * | 11/2009 | Levitan | G01S 5/0081 455/404.2 |
| 7,729,712 B2 * | 6/2010 | Gottlieb | H04M 1/2745 455/41.2 |
| 8,149,112 B2 * | 4/2012 | Schlager | A61N 1/08 340/539.13 |
| 8,660,480 B2 * | 2/2014 | Jacobs | H04W 4/22 370/310.2 |
| 8,717,180 B2 | 5/2014 | Granhed et al. | |
| 9,342,976 B2 * | 5/2016 | Pfeffer | G08B 25/006 |
| 2006/0035622 A1 * | 2/2006 | Kampel | A63B 29/021 455/404.2 |
| 2009/0066516 A1 * | 3/2009 | Lazo | G06K 19/0724 340/572.7 |
| 2013/0194100 A1 * | 8/2013 | Granhed | A63B 29/021 340/584 |
| 2013/0201016 A1 * | 8/2013 | Lo | G08B 27/006 340/502 |
| 2013/0234851 A1 * | 9/2013 | Amis | G08B 15/001 340/539.13 |
| 2015/0033289 A1 * | 1/2015 | Caceres | H04W 12/08 726/3 |
| 2015/0061398 A1 * | 3/2015 | Kudo | H04B 5/0031 307/104 |

FOREIGN PATENT DOCUMENTS

| | | | | |
|---|---|---|---|---|
| EP | 2362960 | | 3/2014 | |
| SE | EP 2362960 A1 * | 9/2011 | | G06K 19/027 |
| SE | EP 2362960 B1 * | 3/2014 | | G06K 19/027 |
| WO | 2014034966 A1 | | 3/2014 | |

* cited by examiner

METHOD AND APPARATUS FOR GENERATING DISTRESS SIGNAL

RELATED APPLICATION(S)

This application claims the benefit under 35 U.S.C. §119(a) of a Korean patent application filed in the Korean Intellectual Property Office on Dec. 29, 2014 and assigned Serial No. 10-2014-0191955, the entire disclosure of which is incorporated herein by reference.

BACKGROUND

The present disclosure relates to wireless communication, and more particularly to apparatuses and methods for generating distress signals from mobile devices.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as sensing technology, wired/wireless communication and network infrastructure, service interface technology, and Security technology have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

A mobile terminal, such as a cellular phone or smartphone, may connect itself to a cellular system, i.e., a mobile communication network, to establish a call through a base station of the mobile communication network. A smartwatch or other additional devices interworkable with the cellular phone or smartphone may perform communication alone or in association with the mobile terminal.

Such a mobile device may have call failures or call drops in a non-service area not covered by radio signals from the base station. This may happen, for example, in rural areas, a shadow area to signals, at a mountain or at sea. Also, absent battery power sufficient to access the network, the mobile device cannot establish a call nor can it send out distress signals. The user also may not be able to dispatch distress signals through his mobile device in emergency situation, such as, for example, natural disaster, distress, or unconsciousness. Thus, there is a need for technology to generate distress signals through a mobile device in such emergencies.

The above information is presented as background information only to assist with an understanding of the present disclosure. No determination has been made, and no assertion is made, as to whether any of the above might be applicable as prior art with regard to the present disclosure.

SUMMARY

The present disclosure provides an apparatus and method for increasing the probability of detecting a person in distress.

The present disclosure provides an apparatus and method for generating distress signals through a mobile device.

The present disclosure provides an apparatus and method for generating distress signals using a communication antenna of a mobile device.

The present disclosure provides an apparatus and method for generating distress signals using a cellular antenna of a mobile device.

The present disclosure provides an apparatus and method for generating distress signals through a mobile device when the mobile device runs out of battery.

According to an embodiment of the present disclosure, the apparatus comprises a coil antenna configured for short-range communication, a first communication circuit configured to perform the short-range communication using the coil antenna in a normal mode; a second communication circuit configured to transmit a distress signal having a rescue-dedicated frequency through the coil antenna during a distress mode, a switch configured to connect the coil antenna to any one of the first communication circuit and the second communication circuit, and a processor configured to determine the normal mode and the distress mode to control the switch.

According to an embodiment of the present disclosure, a method for generating a distress signal from a mobile device comprises determining, by a processor, a distress mode, connecting the coil antenna to a second communication circuit when the distress mode is detected, wherein the second communication circuit is configured to generate a distress signal having a rescue-dedicated frequency, and connecting a coil antenna for short-range communication to a first communication circuit configured to perform the short-range communication when the distress mode is not detected.

According to an embodiment of the present disclosure, an apparatus for generating a distress signal in a mobile device comprises a radio frequency (RF) module configured to perform cellular communication using a cellular antenna in a normal mode, a reflecting circuit configured to transmit a distress signal by reflecting a detection signal received through the cellular antenna in a distress mode; a switch configured to connect the cellular antenna to any one of the RF module and the reflecting circuit, and a processor configured to determine the normal mode or the distress mode to control the switch.

According to an embodiment of the present disclosure, a method for generating a distress signal from a mobile device comprises determining, by a processor, a distress mode, connecting a cellular antenna for cellular communication of the mobile device to a reflecting circuit configured to transmit a distress signal by reflecting a detection signal received through the cellular antenna when the distress mode is detected, and connecting the cellular antenna to an RF circuit configured to perform the cellular communication when the distress mode is not detected.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

Various embodiments of the present disclosure and the foregoing and other aspects, features, and advantages will be apparent from the following detailed description taken in conjunction with the accompanying drawings, wherein.

It should be noted that the same or similar reference denotations may be used to refer to the same or similar elements, features, or structures throughout the drawings.

DETAILED DESCRIPTION

Figure 1:
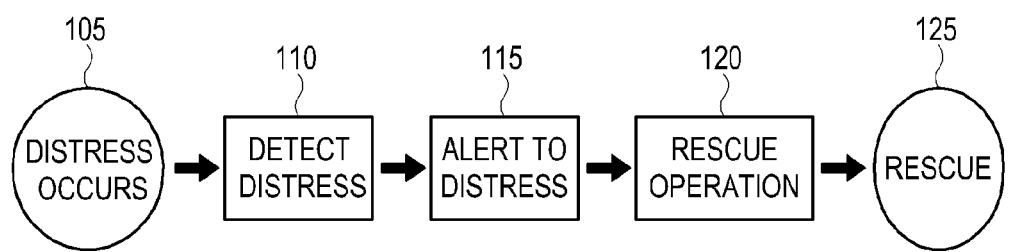
FIG. 1 illustrates a typical rescue process.

Hereinafter, embodiments of the present disclosure are described in detail with reference to the accompanying drawings.

In describing the embodiments, description of technologies that are known in the art and are not directly related to the present disclosure is omitted. This is to further clarify the gist of the present disclosure without clutter.

For the same reasons, some elements may be exaggerated or schematically shown. The size of each element does not necessarily reflect the real size of the element, or proportional sizes to other elements. The same reference numeral is used to refer to the same element throughout the drawings.

Advantages and features of the present disclosure, and methods for achieving the same may be understood through the embodiments described below taken in conjunction with the accompanying drawings. However, the present disclosure is not limited to the embodiments disclosed herein, and various changes may be made thereto. The embodiments disclosed are provided to inform one of ordinary skill in the art of the category of the present disclosure. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). It should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A "unit" may be configured in a storage medium that may be addressed or may be configured to reproduce one or more processors. Accordingly, as an example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a "unit" may be combined with additional elements or may be split into sub-elements or subunits. Furthermore, an element or a "unit" may be implemented to reproduce one or more central processing units (CPUs) in a device or a security multimedia card.

Although the description of embodiments herein primarily focuses on mobile terminals operating on typical cellular mobile communication systems, the subject matter of the present disclosure may also be applicable to other communication systems and services having similar technical backgrounds without departing from the scope of the present disclosure.

FIG. 1 illustrates a typical rescue process. Referring to FIG. 1, the user is in distress (105), and the user himself or the mobile device carried by the user detects the distress (110). As an example, the mobile device may be any one of a cellular communication device, such as a smartphone, and a short-range communication device or an additional device that may interwork with the cellular communication device and may access a mobile communication network directly or via the cellular communication device. A scheme for the mobile device to detect the user's distress is described below. The mobile device alerts (advertises) a specified or unspecified recipient(s) to the distress automatically or in response to the user's manipulation (115). A rescue team who receives the distress alert does its rescue operation (120), and the rescue operation is done (125).

However, sometimes the mobile device may not be able to normally access the network. For example, the mobile device cannot dispatch distress signals through the mobile communication network when the mobile device is positioned in a non-service area or shadow area of the cellular mobile communication network, or if its battery is too low. Accordingly, different distress mode operations may need to be carried out depending on different circumstances.

Figure 2:
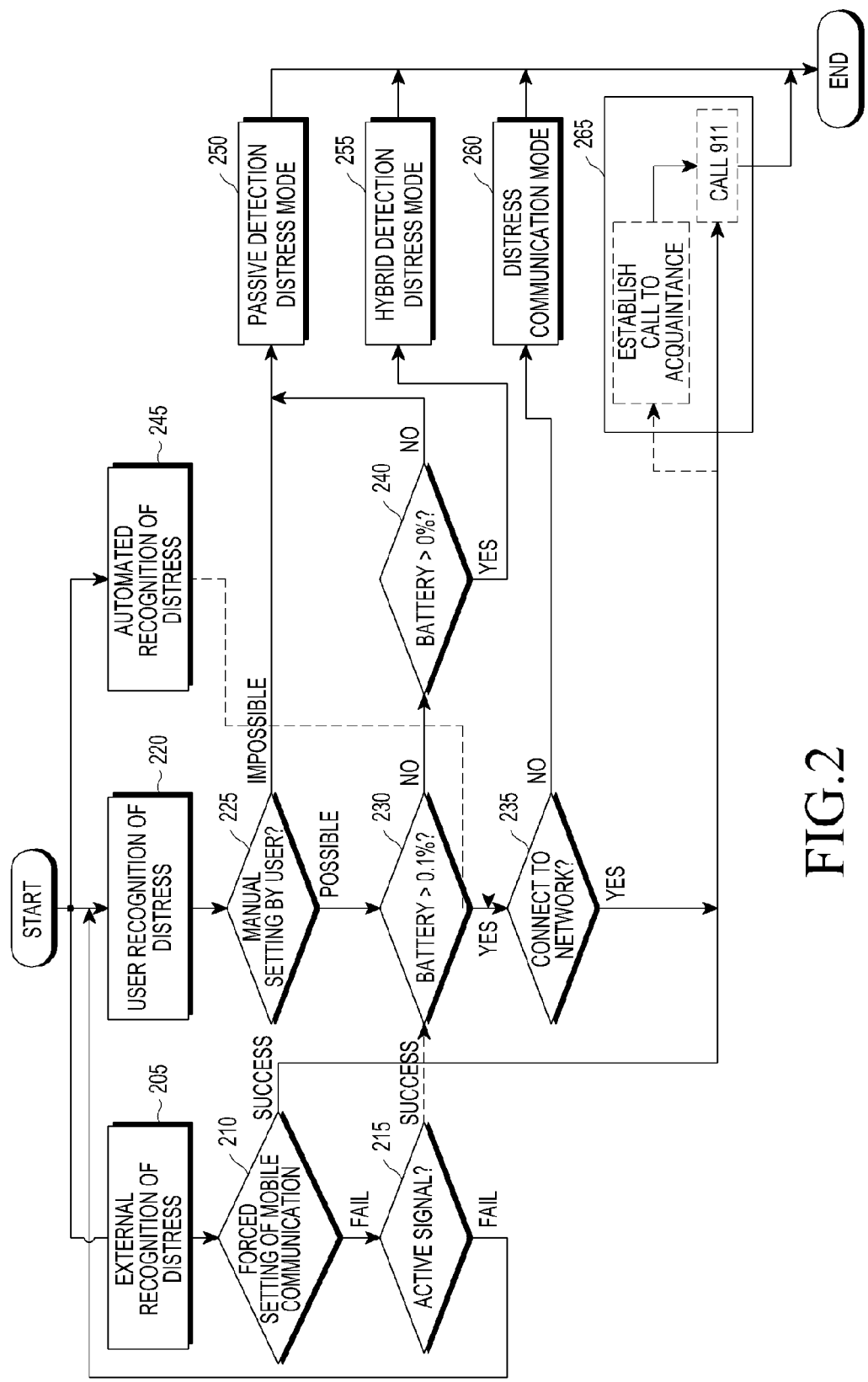
FIG. 2 is a flowchart illustrating a distress mode operation according to an embodiment of the present disclosure.

FIG. 2 is a flowchart illustrating a distress mode operation according to an embodiment of the present disclosure. Referring to FIG. 2, distress may be detected by at least one of external recognition 205, user recognition 220, and automatic recognition 245.

The user recognition 220 means that the user himself recognizes the distress. Upon sensing the distress, the user manipulates his mobile device, and the mobile device attempts to connect to the mobile communication network in response to the user's manipulation (225). When access to the mobile communication network is possible, the mobile device determines whether the battery level exceeds a minimum value (e.g., 0.1%) needed for communication (230). When the remaining battery power is high enough to establish a connection to the mobile communication network, i.e., when the battery level exceeds 0.1%, the mobile device determines whether the connection to the mobile communication network succeeds (235). When the connection to the mobile communication network is successful, the mobile device may establish a call to a phone number that has been previously determined or requested by the user or establish a call to a rescue team (e.g., a 911 team) (265) and may send a request for rescue through the call.

When it is determined in operation 225 that the connection to the mobile communication network by the user's manipulation is impossible, the mobile device enters into a passive (manual detection) distress mode (250). In the passive distress mode, the mobile device may passively generate a distress signal in response to an external signal. As an example, the passive distress mode may use a harmonic radar scheme or harmonic backscattering using an unbiased diode.

When it is determined in operation 230 that the battery level is not more than 0.1%, the mobile device determines whether there is any power remaining in the battery, i.e., whether the battery level exceeds 0% (240). When the battery level is 0%, the mobile device operates in the passive distress mode (250). By contrast, when the battery level exceeds 0%, the mobile device operates in a hybrid detection distress mode (255). In the hybrid detection distress mode, the mobile device sends out a distress signal using a harmonic backscattering scheme using a biased diode or using a low-power communication scheme such as Bluetooth low energy (BLE). The distress signal may be detected by an ambient detector using the same communication scheme.

When the connection to the mobile communication network fails in operation 235, the mobile device enters into a distress communication mode (260). In the distress communication mode, the mobile device sends out distress signals using a predetermined communication scheme, such as BLE, Wi-Fi, long-term evolution direct (LTE-D), or a 457 kH beacon. The distress signal may be detected by an ambient detector using the same communication scheme.

The external recognition 205 may be achieved by a third party or external signal other than the user or the mobile device. When distress is detected by the external recognition 205, the user or the third party attempts to connect to the mobile communication network through the mobile device (210). Upon successful connection to the mobile communication network, the mobile device may establish a call to a phone number that has been previously determined or requested by the user or may establish a call to the rescue team (e.g., a 911 team) to request rescue.

Automatic recognition 245 means that the mobile device detects distress on its own. As an example, the mobile device traces its movement through its equipped motion sensor, and when there is no motion (still state) for a predetermined time after sensing sudden movement, the mobile device determines it as distress. As another example, when a still state lasts a predetermined time within a portion of a day (abnormal time period) set by the user or the mobile device itself, for example, from 6:00 AM to 12:00 PM, the mobile device may determine that there is distress. As still another example, when there is no response to incoming calls continues, for example, when the number of missed calls for a predetermined period exceeds a threshold, the mobile device may determine that there is distress. When detecting the user's movement after sensing the distress and entering the distress mode, or when the distress mode is requested to be canceled by the user, the mobile device may exit the distress mode.

When distress is detected by automatic recognition 245, the mobile device attempts to connect to the mobile communication network and determines whether the connection succeeds (235). Upon successful connection to the mobile communication network, the mobile device may establish a call to a phone number that has been previously determined or requested by the user or may establish a call to the rescue team (e.g., a 911 team) (265) and may send a request for rescue through the call. When the connection to the mobile communication network fails in operation 235, the mobile device enters into the distress communication mode (260) to send out a distress signal using a predetermined communication scheme.

Although the description of embodiments herein primarily focuses on smartphones connecting to the mobile communication network, the subject matter of the present disclosure may also be applicable to other communication apparatuses and devices having similar technical backgrounds without departing from the scope of the present disclosure.

For example, the electronic device according to embodiments of the present disclosure may include at least one of, for example, a smartphone, a tablet personal computer (PC), a mobile phone, a video phone, an e-book reader, a laptop computer, a netbook computer, a personal digital assistant (PDA), a portable multimedia player (PMP), a MPEG-1 audio layer-3 (MP3) player, a mobile medical device, a camera, or a wearable device. Examples of a wearable device may be, for example, smart glasses, a head-mounted device (HMD), electronic clothes, electronic shoes, an electronic bracelet, an electronic necklace, an electronic appcessory, an electronic tattoo, a smart mirror, and a smart watch.

Figure 3:
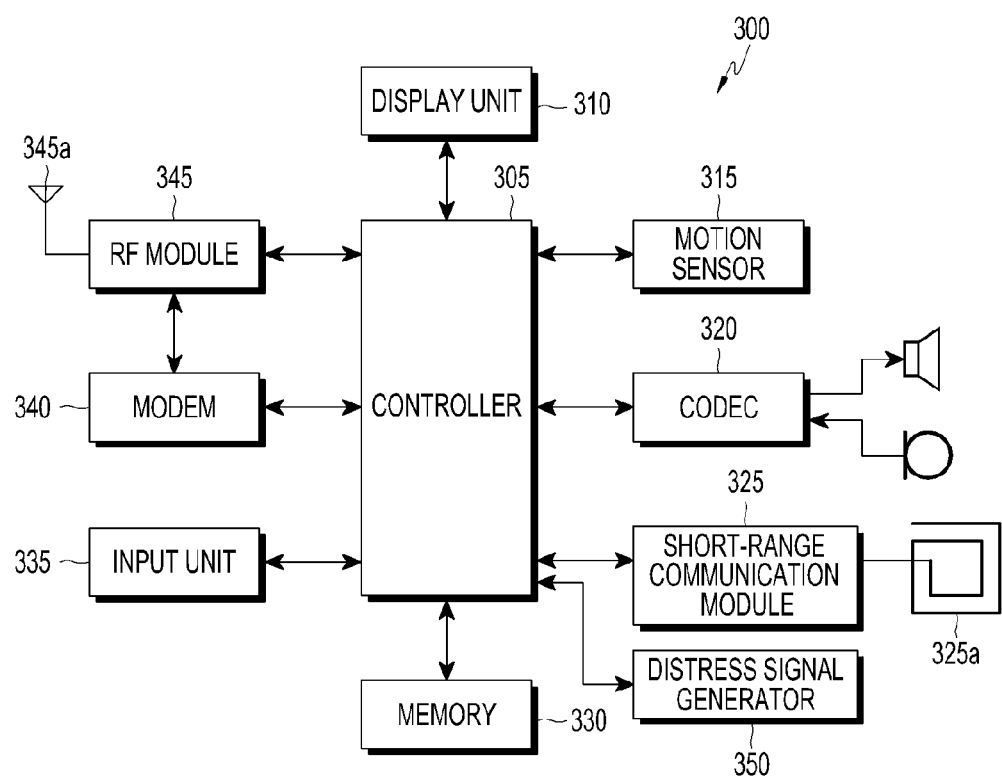
FIG. 3 illustrates a structure of a mobile device according to an embodiment of the present disclosure.

FIG. 3 illustrates a structure of a mobile device according to an embodiment of the present disclosure.

Referring to FIG. 3, a controller 305 controls the overall operation of the mobile device 300 and may include a central processing unit (CPU), a read only memory (ROM) storing a control program to control the mobile device 300, and a random access memory (RAM) to record signals or data input from the outside of the mobile device 300 or used as a storage area for tasks performed on the mobile device 300. The CPU may comprise, for example, a single core, a dual core, a triple core, or a quad core. The CPU, the ROM, and the RAM may be interconnected with one another via an internal bus. The controller 305 may operate in distress mode by detecting distress on its own, analyzing results sensed by a motion sensor 315, or receiving a user input through an input unit 335. The controller 305 may also include an application processor (AP) or a sensor hub configured to detect distress. The sensor hub may compile data from at least one sensor and analyze the data to detect a given circumstance, especially distress.

A display unit 310 may include at least one of a display screen and a touchscreen and may output a user interface to activate or exit the distress mode under control of the controller 305.

A codec 320 outputs a voice, music, or sound through a speaker under control of the controller 305 or transfers a signal sensed by a microphone to the controller 305.

A sub-communication module 325 for short-range communication may be connected to a sub-antenna 325a for wired or wireless communication (hereinafter, auxiliary communication) other than the cellular mobile communication network. The sub-communication module 325 may be configured to support, for example, at least one of Bluetooth, BLE, near-field communication (NFC), Wi-Fi, or Wi-Fi-direct. The sub-antenna 325a may include an antenna module to support the various communication schemes. Furthermore, the sub-antenna 325a may include a receiving coil for wireless charging such as wireless power consortium (WPC), alliance for wireless power (A4WP), or wireless power transfer (WPT), and a magnetic signal transmission coil such as magnetic secure transmission (MST).

A memory 330 stores data, parameters, and program codes necessary for the operation of the controller 305.

The input unit 335 is configured to be able to receive a user input such as, for example, a request for distress mode, and may include at least one of a keypad, a touchpad, and a touchscreen.

A modem 340, configured to support at least one communication protocol for mobile communication networks, converts a signal to be transmitted into a format according to the communication protocol of the mobile communication network under the control of the controller 305 and transfers the signal to a radio frequency (RF) module 345 or demodulates a signal received by the RF module 345 and transfers the demodulated signal to the controller 305. The RF module 345 is connected with a cellular antenna 345a to communicate RF signals in a frequency band of the mobile communication network.

A distress signal generator 350 may be connected with at least one of the cellular antenna 345a and the sub-antenna 325a to generate a distress signal. The distress signal generator 350 may be connected with at least one of the cellular antenna 345a and the sub-antenna 325a when the mobile device 300 is operating in distress mode due to actions of the controller 305 or the user.

Figure 4:
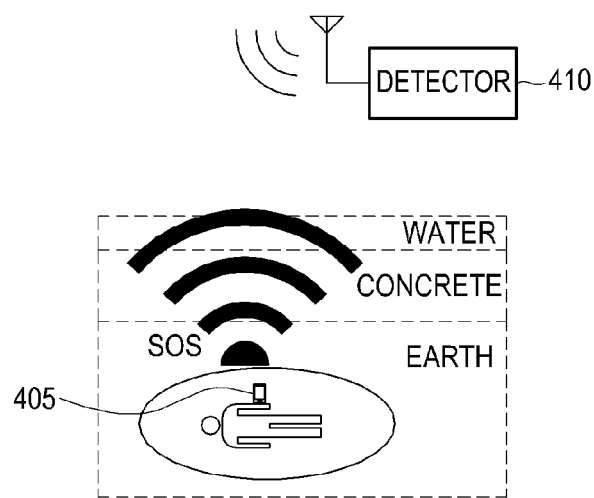
FIG. 4 illustrates sending out a distress signal at a rescue-dedicated frequency of the present disclosure according to an embodiment of the present disclosure.

FIG. 4 illustrates sending out a distress signal at a rescue-dedicated frequency according to an embodiment of the present disclosure.

Referring to FIG. 4, a mobile device 405 including a distress signal generator generates a low-frequency signal having a rescue-dedicated frequency such as, for example, a frequency of 457 kHz using an antenna embedded in the mobile device 405. 457 kHz is an international standard frequency used for rescue. The distress signal at this frequency may propagate through barriers such as water, concrete, earth, or snow, where the propagation may depend on an amount of the specific barrier. A detector 410 may detect a distress signal to locate the person carrying the mobile device 405.

The following major issues are presented to equip a typical mobile device with a distress signal generator.
(1) Minimize the space for antennas
(2) Minimize the number of circuit parts added
(3) Minimize power consumption In the following embodiments, a shared-antenna distress signal generator is configured by coupling a switch and a power amplifier having a rescue-dedicated frequency to a sub-antenna 325a of the mobile device.

Figure 5:
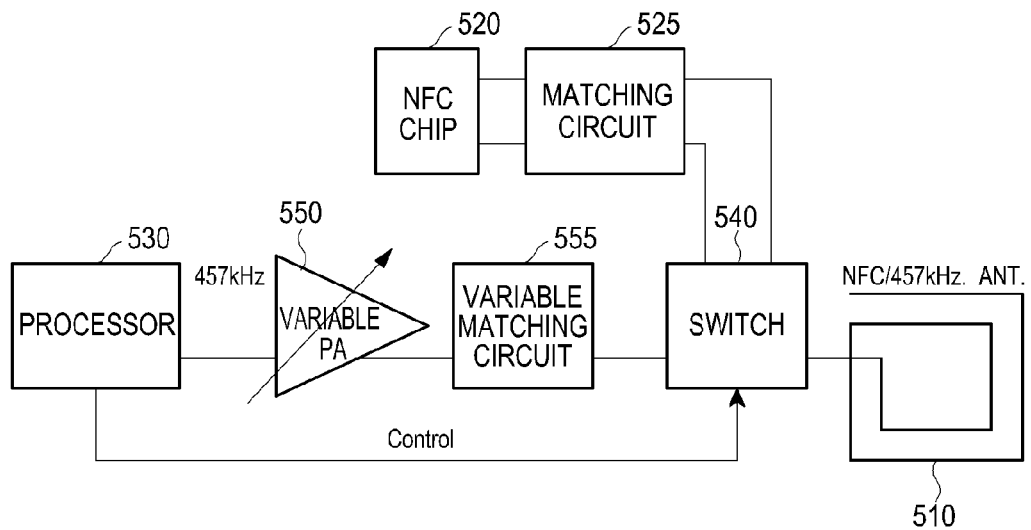
FIG. 5 illustrates a structure of an apparatus for sending out a distress signal at a rescue-dedicated frequency in a mobile device according to an embodiment of the present disclosure.

FIG. 5 illustrates a structure of an apparatus for sending out a distress signal at a rescue-dedicated frequency in a mobile device according to an embodiment of the present disclosure. Although a coil antenna 510 (or loop antenna) for NFC already embedded in the mobile device is shown as an example of the sub-antenna 325a, an antenna for sub-communication other than the NFC antenna may also be used to transmit signals at the rescue-dedicated frequency.

Referring to FIG. 5, the coil antenna 510 may be a legacy NFC antenna used for NFC, and the coil antenna 510 is connected to a matching circuit 525 of an NFC chip 520 via a switch 540 or connected to a matching circuit 555 and a power amplifier (PA) 550 to generate distress signals.

When the mobile device operates in a normal mode, the switch 540 connects the coil antenna 510 to the NFC chip 520 via the matching circuit 525. The matching circuit 525 may include a capacitor suitable for NFC frequency of 13.56 MHz. The coil antenna 510 connected with the NFC chip 520 may perform normal NFC transmission/reception.

A processor 530 may be embedded in the controller 305 of the mobile device or may be provided independently from the controller 305. When automatically detecting distress or receiving a request to operate in a distress mode from the user, the processor 530 controls the switch 540 to connect the coil antenna 510 to the power amplifier 550 via the matching circuit 555. The power amplifier 550 may receive a signal having the rescue-dedicated frequency, for example, 457 kHz, from the processor 530 and amplifies the signal. The amplified signal may be received by the coil antenna 510 via the matching circuit 555 and the switch 540, and may be transmitted by the coil antenna 510.

Figure 6:
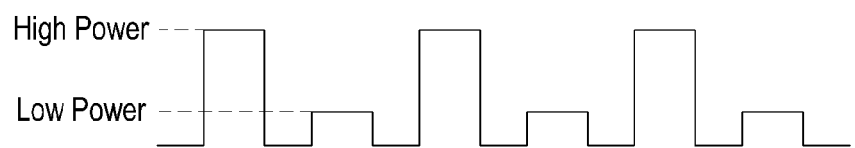
FIG. 6 illustrates a variation in strength of a distress signal according to an embodiment of the present disclosure.

In an embodiment, the power amplifier 550 may be configured as a variable power amplifier (or tunable PA) that is able to vary the signal strength of the 457 kHz distress signal. FIG. 6 illustrates a variation in strength of a distress signal according to an embodiment of the present disclosure. That is, the pulses of the 457 kHz distress signal are transmitted at predetermined periods, and the pulses may be sent out with higher power or lower power.

In an embodiment, the matching circuit 555 may be configured as a variable matching circuit (or a tunable matching circuit) varying the matching value depending on the state and circumstance of the mobile device. The coil antenna 510 may include an NFC antenna and an expanded coil antenna occupying the area of the cover case covering the mobile device, and in such case, the matching value of the variable matching circuit may vary depending on whether the cover case is opened or closed. A matching value for the opened state of the cover case and a matching value for the closed state of the cover case may have been previously stored in the matching circuit 555 or the processor 530, and the matching value of the variable matching circuit may be determined under the control of the processor 530.

Figure 7:
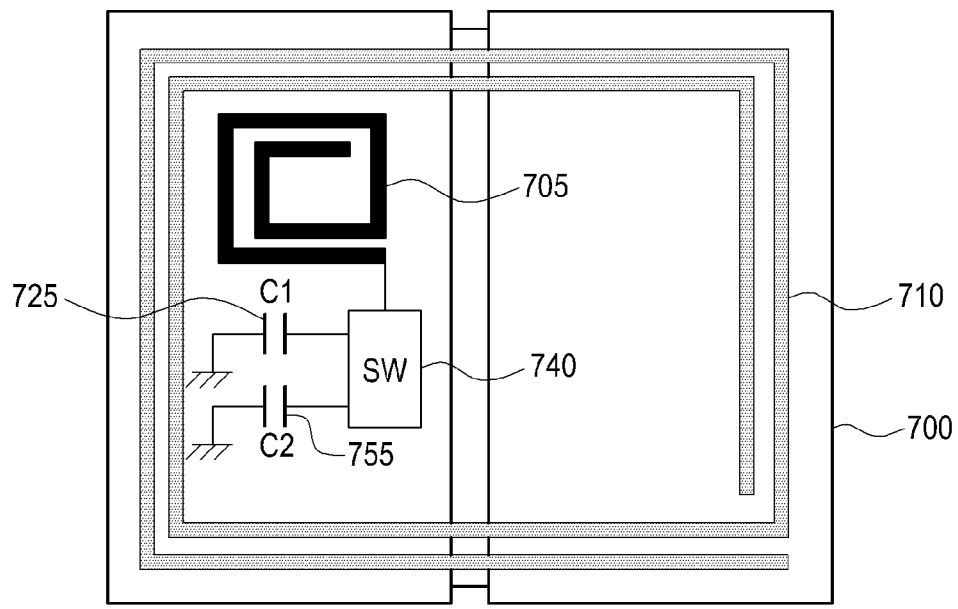
FIG. 7 illustrates a structure of a mobile device having a coil antenna embedded in a cover case according to an embodiment of the present disclosure.

FIG. 7 illustrates a structure of a mobile device having a coil antenna embedded in a cover case according to an embodiment of the present disclosure.

Referring to FIG. 7, a mobile device may include an NFC antenna 705 configured with a relatively smaller area of coil antenna. The NFC antenna 705 is connected to a matching circuit 725 of the NFC chip or a matching circuit 755 for generating distress signals via a switch 740. The mobile device may be coupled with a cover case 700 that may cover the housing of the mobile device or may be integrally formed with the battery cover, and the cover case 700 includes a cover coil antenna 710 having an area including the area of the NFC antenna 705. The cover coil antenna 710 may be disposed along the edges of the cover case 700 of the mobile device to surround the NFC antenna 705. The cover coil antenna 710, while not in direct contact with the NFC antenna 705, may be electronically (or magnetically) coupled with the NFC antenna 705 to reinforce the near field of the NFC antenna 705.

The matching circuit 725 for the NFC chip may include a capacitor C1 having a fixed capacitance of $C_1$. The matching circuit 755 for generating distress signals may include a variable capacitor C2 having a capacitance $C_{21}$ or $C_{22}$ depending on whether the cover case 700 is opened or closed. The capacitance of the variable capacitor C2 may be controlled by the processor 530.

Figure 8:
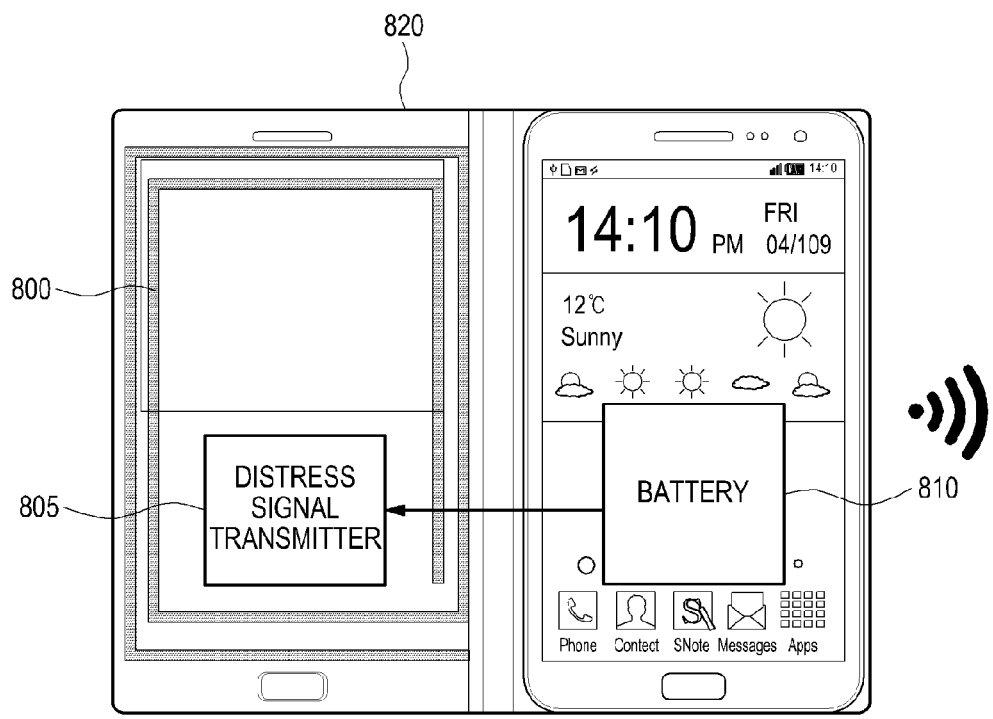
FIG. 8 illustrates a structure of a distress signal transmitter embedded in a cover case of a mobile device according to an embodiment of the present disclosure.

FIG. 8 illustrates a structure of a distress signal transmitter embedded in a cover case of a mobile device according to an embodiment of the present disclosure.

Referring to FIG. 8, the cover case 820 for a mobile device includes a distress signal transmitter 805 that may send out distress signals having a rescue-dedicated frequency and a cover coil antenna 800 along the edges of a surface of the cover case 820. The distress signal transmitter 805 may receive power from a battery 810 of the mobile device through the back surface of the cover case 820.

The cover case 820 shown in FIG. 8 may be a dedicated case for sports or exploration, and the distress signal transmitter 805 is configured to turned on or off by the user or by a processor of the mobile device.

As set forth above, the distress signal transmitter periodically sends out distress signal pulses in the distress mode. Automated transmission of distress signals may be initiated when the user's movement is not detected for a predetermined time after setting up the mobile device for distress detection, as long as the user is not using the mobile device for activities such as, for example, having the display on, making voice call, data communication, running an application, etc. Distress may not be determined until lack of movement is noted for a predetermined time such as, for example, four minutes, after meeting a given transmission condition. Alternatively, the user may manually start the automated transmission of distress signals through the mobile device. Further transmission may depend on, for example, settings for distress transmission.

In an embodiment, the automated transmission of distress signals sends out distress signal pulses at given periods. Alternatively, the automated transmission of distress signals may be carried out at periods set depending on the remaining battery power of the mobile device. As an example, when the battery level of the mobile device exceeds a predetermined threshold, the transmission of distress signals may be every second. As another example, when the battery level of the mobile device is less than the threshold, the transmission of distress signals may be every two seconds and the transmission interval may increase as the battery level decreases.

As an embodiment, the mobile device may automatically send out distress signals for a predetermined time. Alternatively, the mobile device may pause the automated transmission of distress signals in response to a request from the user. In another embodiment, the mobile device may perform automated transmission of distress signals until the battery power runs out while gradually increasing the interval for transmission of distress signals based on the remaining battery power.

Figure 9:
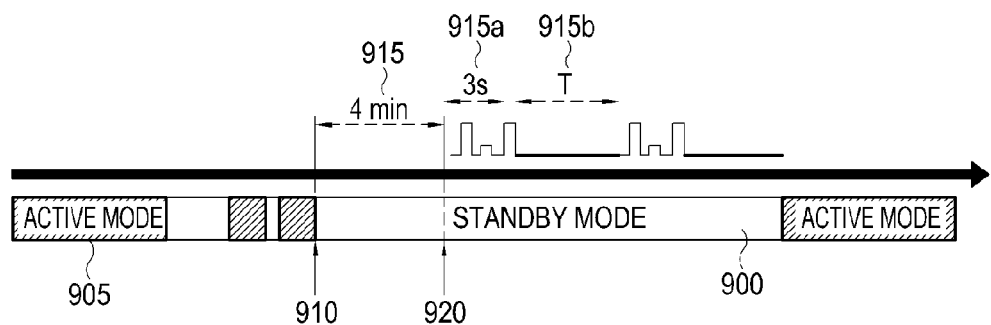
FIG. 9 is a timing view illustrating an operation of automatically transmitting a distress signal according to an embodiment of the present disclosure.

FIG. 9 is a timing view illustrating an operation of automatically transmitting a distress signal according to an embodiment of the present disclosure.

Referring to FIG. 9, in an active mode 905 in which the mobile device is in use for calling, data communication, or running an application, the distress mode does not run, and the mobile device abstains from sending out distress signals. In such normal circumstance, the processor 530 controls the switch 540 to connect the coil antenna 510 to the NFC chip 520.

When a standby mode 900 is maintained for a predetermined time 915 from the time 910 when the standby mode 900 begins, the mobile device transmits distress signals (920). The mobile device sends out distress signals for a predetermined transmission time 915a that may be, for example, three seconds, and after waiting for a T time 915b, resumes the transmission of distress signals for the transmission time 915a. The transmission time 915a may gradually increase according to a predetermined pattern or according to the remaining battery power of the mobile device.

In the following embodiments, distress signals are transmitted via a cellular antenna of the mobile device. When the battery power of the mobile device has run out or is too low to operate the distress signal transmitter at the distress signal-dedicated frequency, the mobile device may send out distress signals by passively reflecting signals through the cellular antenna. A detector positioned near the mobile device may then be able to locate the person in distress by receiving a reflected signal.

Figure 10:
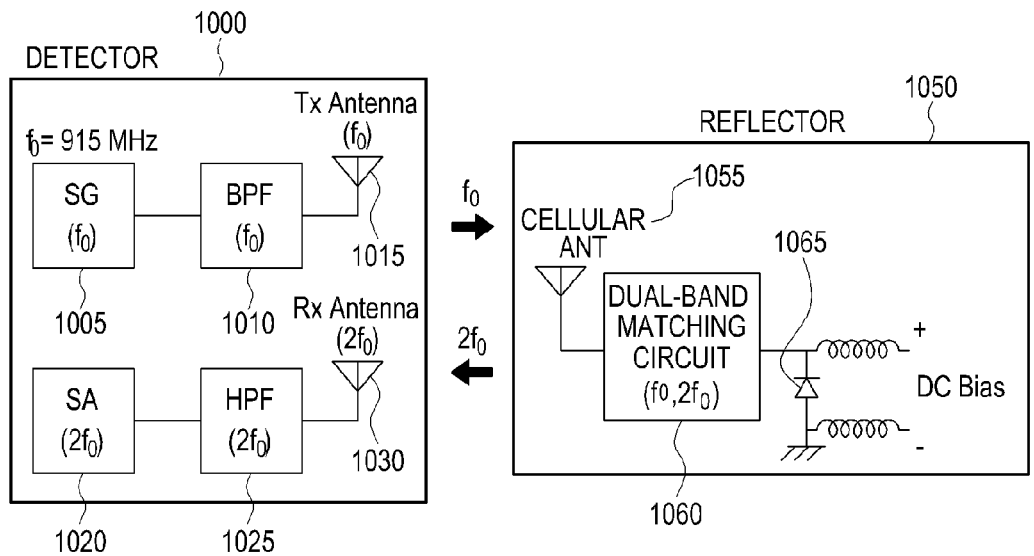
FIG. 10 illustrates a structure of a rescue system according to an embodiment of the present disclosure.

FIG. 10 illustrates a structure of a rescue system according to an embodiment of the present disclosure.

Referring to FIG. 10, the rescue system includes a detector 1000 transmitting detection signals having a predetermined frequency $f_0$ and a reflector 1050 transmitting distress signals of $2f_0$ in response to reception of the detection signals. In an embodiment, the frequencies $f_0$ and $2f_0$ may be determined to avoid the frequency band of the cellular mobile communication network. In the example illustrated, $f_0$=915 MHz.

A transmission path of the detector 1000 includes a signal generator 1005 generating detection signals of $f_0$, a band pass filter (BPF) 1010 filtering out signals other than signals within a predetermined bandwidth centered on $f_0$, and a transmission antenna 1015 transmitting the filtered signals. The reception path of the detector 1000 includes a reception antenna 1030 receiving distress signals of $2f_0$, a high pass filter (HPF) 1025 selectively receiving only signals with frequencies higher than $2f_0$, and a signal analyzer (SA) 1020 analyzing the reception strength of the filtered signals.

The reflector 1050 may be embedded in the mobile device accessible to the cellular mobile communication network and shares the cellular antenna 1055 used for cellular mobile communication by the mobile device. The reflector 1050 includes a cellular antenna 1055 capable of receiving detection signals of frequency $f_0$ and transmitting distress signals of frequency $2f_0$, a dual-band matching circuit 1060 configured to operate with matching values corresponding to frequencies $f_0$ and $2f_0$, and a reflecting circuit 1065 receiving the detection signals via the dual-band matching circuit 1060. The reflector 1050 may convert the detection signals into distress signals of frequency $2f_0$ and re-transmit the distress signals. The reflector 1050 may operate by the principle of passive backscattering and may send out distress signals even when the battery power of the mobile device has run out.

Figure 11:
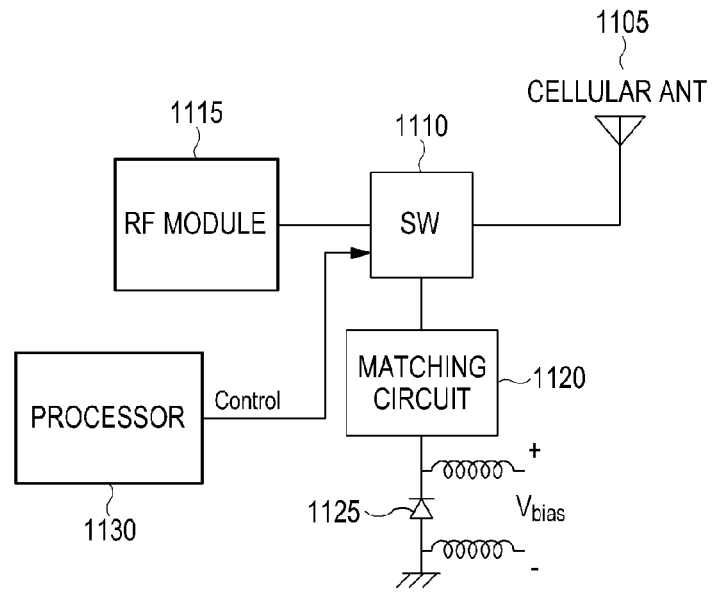
FIG. 11 illustrates a structure of a distress signal transmitter including a reflecting circuit in a mobile device according to an embodiment of the present disclosure.

FIG. 11 illustrates a structure of a distress signal transmitter including a reflecting circuit in a mobile device according to an embodiment of the present disclosure.

Referring to FIG. 11, the cellular antenna 1105 is used for typical cellular mobile communication in the mobile device and is connected to an RF module 1115 by a switch 1110 or connected to a reflecting circuit 1125 for generating distress signals. In an embodiment, the reflecting circuit 1125 may be connected to the switch 1110 via a matching circuit 1120.

The reflecting circuit 1125 may include a Schottky diode that may be biased by a voltage $V_{bias}$. When a detection signal of frequency $f_0$ received through the cellular antenna 1105 is input by the switch 1110, the reflecting circuit 1125 converts the detection signal into a distress signal of $2f_0$ and transmits the distress signal.

When the mobile device operates in the normal mode, the switch 1110 connects the cellular antenna 1105 to the RF module 1115. The RF module 1115 outputs RF signals for normal cellular communication of the mobile device or processes RF signals inputted.

A processor 1130 may be embedded in the controller 305 of the mobile device or may be provided independently from the controller 305. When automatically detecting distress or receiving a request to operate in a distress mode from the user, or when determining that there is little to no battery power remaining, the processor 1130 controls the switch 1110 to connect the cellular antenna 1105 to the reflecting circuit 1125 directly or via the matching circuit 1120. When there is a detection signal coming in through the cellular antenna 1105, the reflecting circuit 1125 generates a distress signal, and the distress signal is transmitted by the cellular antenna 1105 through the switch 1110. In an embodiment, the processor 1130 may connect the cellular antenna 1105 to the reflecting circuit 1125 through the switch 1110 depending on the user's selection when operating in the normal mode. As an example, in standby mode when the cellular mobile communication is not in use, the processor 1130 connects the cellular antenna 1105 to the reflecting circuit 1125 instead of the RF module 1115 for a period that is previously determined or selected by the user. During the remaining period of the standby mode or in an active mode where the cellular mobile communication is used, the cellular antenna 1105 may be connected to the RF module 1115.

Figure 12:
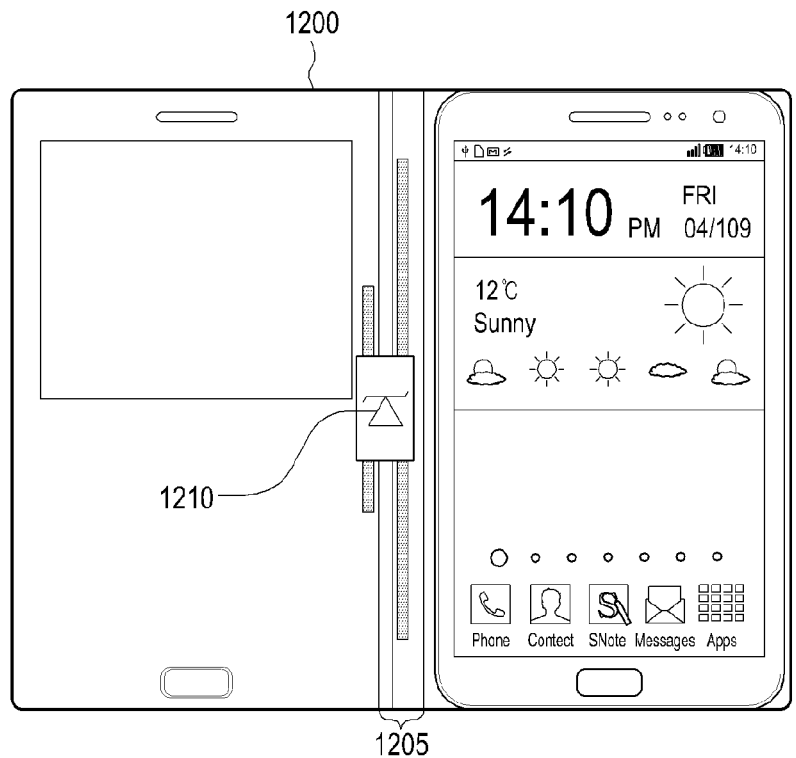
FIG. 12 illustrates an example of a manual reflecting circuit according to an embodiment of the present disclosure.

FIG. 12 illustrates an example in which a manual reflecting circuit is equipped according to an embodiment of the present disclosure.

Referring to FIG. 12, the cover case 1200 may be configured to cover the housing of the mobile device or to be integrally formed with the battery cover of the mobile device, and the Schottky diode 1210 constituting the reflecting circuit 1065 or 1125, which may be passive, is positioned on a hinge 1205 of the cover case 1200. Accordingly, the reflecting circuit may perform well regardless of whether the cover case is open or closed, detection signals getting cut off by the position or state that the mobile device is placed may be minimized, and the Schottky diode 1210 may be spaced apart from the display and antenna of the mobile device.

Figure 13:
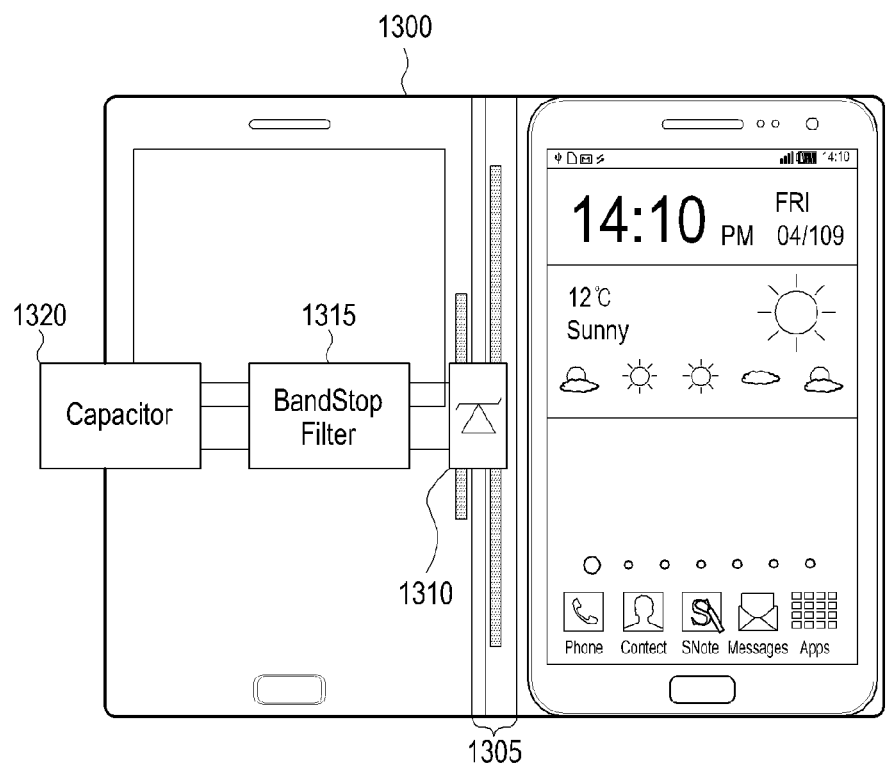
FIG. 13 illustrates an example of a manual reflecting circuit according to an embodiment of the present disclosure.

FIG. 13 illustrates an example in which a manual reflecting circuit is equipped according to an embodiment of the present disclosure.

Referring to FIG. 13, the cover case 1300 may be configured to cover the housing of the mobile device or to be integrally formed with the battery cover of the mobile device, and the Schottky diode 1310 constituting the reflecting circuit 1065 or 1125 is positioned on a hinge 1305 of the cover case 1300. A band stop filter 1315 and a capacitor 1320 may be connected in parallel with the Schottky diode 1310 to filter out signals other than signals within the $2f_0$ bandwidth. The $2f_0$ signals may be re-radiated by the Schottky diode 1310, the power from the filtered out signals may be stored in the capacitor 1320, and a bias may be applied to the Schottky diode 1310 by the power stored in the capacitor 1320.

The passive reflecting circuit is known to have a maximum detection distance of 200 m line of sight (LoS) distance. The detection distance may be less when the reflection efficiency is lowered in the mobile device. When a bias is applied to the Schottky diode 1310, the detection distance may be increased by two times. As illustrated in FIG. 13, bias application power may be collected by the RF energy harvesting structure constituted of the band stop filter 1315 and the capacitor 1320. In an exemplary experimental environment, when a direct current (DC) bias of 0V is applied to the Schottky diode of the reflector, the detector was able to receive signals only up to 5 m, and the signal strength was about −110 dBm. By contrast, when a DC bias of 0.5V is applied to the Schottky diode of the reflector, the detector was able to receive −97 dBm signals up to 30 m away.

Figure 14:
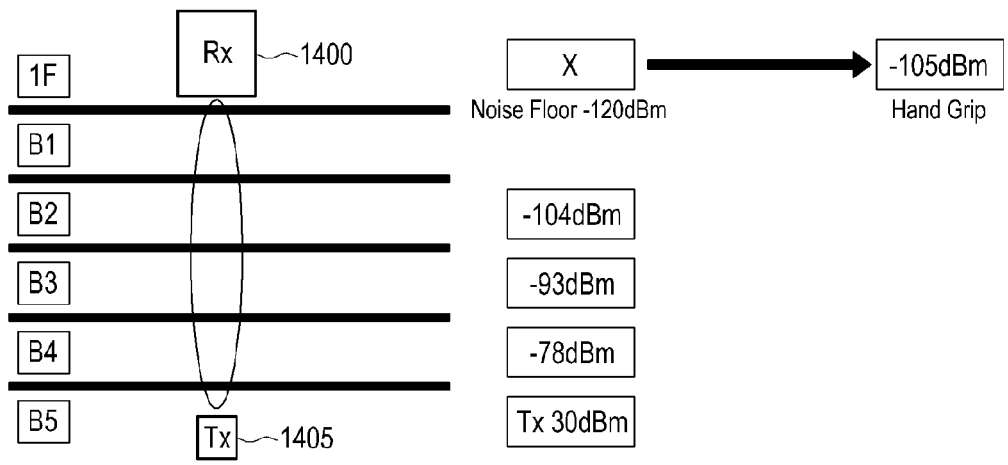
FIG. 14 illustrates an example of the result of a transmission/reception test of a distress signal using backscattering according to an embodiment of the present disclosure.

FIG. 14 illustrates an example of the result of a transmission/reception test of a distress signal using backscattering according to an embodiment of the present disclosure.

Referring to FIG. 14, the mobile device 1405 having a reflector embedded to transmit distress signals is positioned on the fifth floor underground and is sending out 457 kHz distress signals at a power level of 30 dBm. The detector 1400 having a spectrum analyzer embedded therein to detect distress signals was able to detect distress signals at power levels −78 dBm, −93 dBm, and −104 dBm on the fourth, third, and second floors underground, respectively. The reception level on the first floor was −120 dBm which is less than noise level. However, a −105 dBm distress signal, which exceeds the noise level, could be detected by gripping the antenna of the detector 1400 with a hand.

Figure 15:
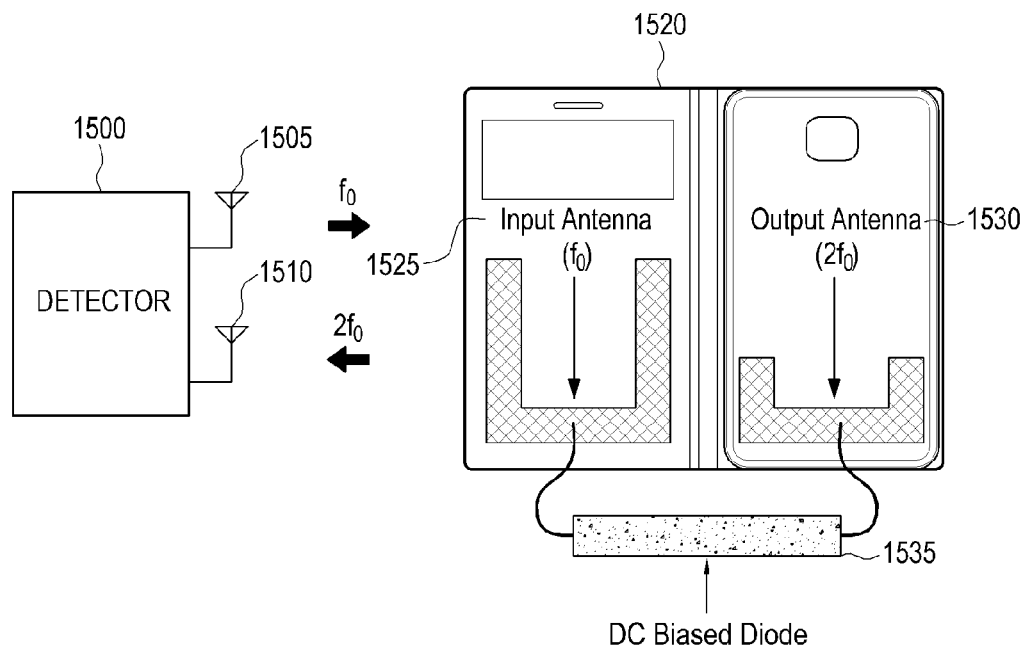
FIG. 15 illustrates a structure of a reflecting device embedded in a cover case of a mobile device according to an embodiment of the present disclosure.

FIG. 15 illustrates a structure of a reflecting device embedded in a cover case of a mobile device according to an embodiment of the present disclosure.

Referring to FIG. 15, the detector 1500 transmits detection signals of frequency $f_0$ through the transmission antenna 1505 and monitors whether distress signals of frequency $2f_0$ are detected through the reception antenna 1510.

The cover case 1520 of the mobile device has an input antenna 1525 in its front surface to receive signals of frequency $f_0$ and an output antenna 1530 in its back surface to transmit signals of frequency $2f_0$. A reflecting circuit 1535 including a DC-biased diode is positioned between the input antenna 1525 and the output antenna 1530. Accordingly, the use of the biased diode may lead to a reduction by about 12 dB in the conversion loss between detection signals and distress signals and an increase by about two times in the maximum detection distance as compared with that by the passive scheme.

Figure 16:
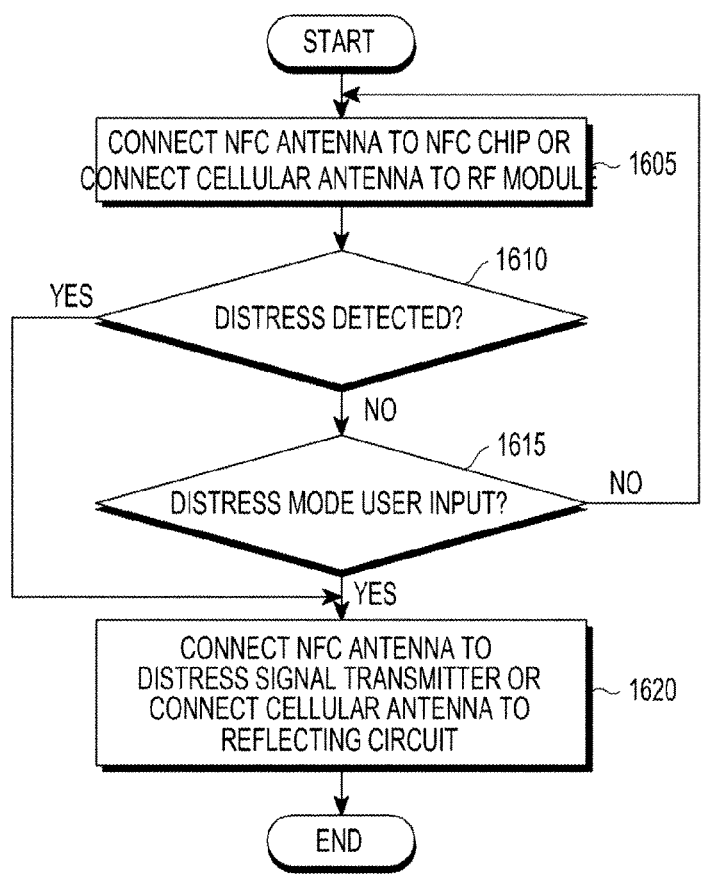
FIG. 16 is a flowchart illustrating a distress mode operation by a mobile device according to an embodiment of the present disclosure.

FIG. 16 is a flowchart illustrating a distress mode operation by a mobile device according to an embodiment of the present disclosure.

Referring to FIG. 16, the mobile device connects an NFC antenna to an NFC chip in operation 1605. Or, the mobile device connects a cellular antenna to an RF module. The mobile device determines whether distress has occurred in operation 1610. As an example, when there is no movement (still state) for a predetermined time or more after detection of a sudden movement, the mobile device may determine that distress has taken place. As another example, when the still state is during an abnormal time period, the mobile device determines that distress has occurred. As still another example, when there is no response to incoming calls, the mobile device may determine that there is distress.

When no distress is detected, the mobile device determines whether a user has requested distress mode in operation 1615.

After detecting distress on its own in operation 1610 or requested by the user to activate the distress mode in operation 1615, the mobile device proceeds to operation 1620 to connect the NFC antenna to the distress signal transmitter instead of the NFC chip. The distress signal transmitter may comprise a variable power amplifier and a variable matching circuit. Or, the mobile device may connect the cellular antenna to the reflecting circuit comprising the Schottky diode, instead of to the RF module. Thereafter, the mobile device may transmit 457 kHz distress signals through the NFC antenna on its own or transmit distress signals of frequency $2f_0$ in response to detection signals of frequency $f_0$ received through the cellular antenna.

The apparatuses and methods according to embodiments of the present disclosure may be implemented in hardware, software, or a combination of hardware and software. The software, which includes any executable code whether compiled or interpretable, may be stored in a machine or computer readable form in volatile or non-volatile storage devices such as, for example, various types of read-only memory (ROM), random access memory (RAM), memory chips, memory devices, or integrated circuit devices, as well as compact disks (CDs), DVDs, magnetic disks, magnetic tapes, or other optical or magnetic storage devices, including those that may be introduced in the future.

The methods according to embodiments of the present disclosure may be implemented by a computer or a portable terminal including a controller and a memory, and the memory may be an exemplary machine or computer readable storage medium that may properly retain program(s) containing instructions for implementing the embodiments of the present disclosure. The software may be distributed over a network via wired or wireless methods, for example, by data transmission over the Internet, and accordingly, the software may be stored and executed in a distributed manner. Functional programs, codes, and code segments to attain various embodiments of the present disclosure may be readily interpreted by those of ordinary skill in the art to which the present disclosure pertains.

The embodiments herein are provided merely for better understanding of the present disclosure, and the present disclosure should not be limited by these embodiments. The embodiments set forth herein are merely examples, and it will be apparent to one of ordinary skill in the art that various changes may be made thereto without departing from the scope of the present disclosure.

What is claimed is:

1. An apparatus for generating a distress signal in a mobile device, the apparatus comprising:
    a coil antenna configured for a short-range communication;
    a first communication circuit configured to transmit or receive signals for the short-range communication using the coil antenna in a normal mode;
    a second communication circuit configured to transmit a distress signal on a rescue-dedicated frequency using the coil antenna in a distress mode;
    a switch configured to connect the coil antenna to either the first communication circuit or the second communication circuit; and
    a processor configured to determine the normal mode and the distress mode to control the switch.

2. The apparatus of claim 1, wherein the short-range communication comprises at least one of near-field communication (NFC), wireless power transfer (WPT), or magnetic secure transmission (MST).

3. The apparatus of claim 1, further comprising a cover coil antenna disposed on at least one edge of a cover case of the mobile device to at least partially surround the coil antenna, and configured to be used for the rescue-dedicated frequency.

4. The apparatus of claim 3, wherein the second communication circuit comprises a variable power amplifier configured to amplify the distress signal having the rescue-dedicated frequency to generate an amplified distress signal, and the variable power amplifier varies amplification of the distress signal to vary signal strength of the amplified distress signal.

5. The apparatus of claim 4, wherein the second communication circuit further comprises a variable matching circuit having a matching value that varies depending on whether the cover case of the mobile device is open or closed.

6. The apparatus of claim 1, wherein the processor, if the mobile device fails to detect a user's movement for a predetermined time, controls the switch to periodically connect the coil antenna to the second communication circuit for a predetermined transmission period, and
    wherein the predetermined time and a connection interval for which the coil antenna is connected to the second communication circuit depends on a remaining battery power of the mobile device.

7. A method for generating a distress signal from a mobile device, the method comprising:
    determining a distress mode;
    connecting a coil antenna to a second communication circuit if the distress mode is detected, wherein the second communication circuit is configured to transmit a distress signal on a rescue-dedicated frequency using the coil antenna; and
    connecting a coil antenna to a first communication circuit if the distress mode is not detected, wherein the first communication circuit is configured to transmit or receive signals for short-range communication using the coil antenna in a normal mode.

8. The method of claim 7, wherein the short-range communication comprises at least one of near-field communication (NFC), wireless power transfer (WPT), or magnetic secure transmission (MST).

9. The method of claim 7, wherein the coil antenna comprises a first coil antenna for the short-range communication of the mobile device and a cover coil antenna disposed on at least one edge of a cover case of the mobile device to at least partially surround the coil antenna, and the cover coil antenna is configured to be used for the rescue-dedicated frequency.

10. The method of claim 7, wherein determining comprises controlling a switch to periodically connect the coil antenna to the second communication circuit for a predetermined transmission period if the mobile device fails to detect a user's movement for a predetermined time, and
 wherein a the predetermined time and a connection interval for which the coil antenna is connected to the second communication circuit depends on a remaining battery power of the mobile device.

* * * * *